BINARY CODE TRANSFORMATION SYSTEM

Filed Dec. 6, 1963

3,300,774

BINARY CODE TRANSFORMATION SYSTEM

André Edouard Joseph Chatelon, Montrouge, and Pierre Girard, Paris, France, assignors to International Standard Electric Corporation, New York, N.Y., a corporation of Delaware Filed Dec. 6, 1963, Ser. No. 328,563
Claims priority, application France, Dec. 28, 1962, 919,928, Patent 1,355,578
2 Claims. (Cl. 340—347)

This invention concerns improvements in pulse code modulation transmission systems in which the signals are transmitted through a certain number of regenerative repeaters. It concerns, in particular, a modification of the transmitted signals in order to improve the stability of the synchronization signal when the latter is elaborated from the received signals and to reduce the bandwidth of the input and output transformers of the repeater.

In the information transmission system called pulse code modulation or "PCM," the digitalized information is expressed in an *n*-digit binary code transmitted serially so as the successive digits occupy regularly spaced time slots.

Each of the time intervals reserved to a digit is called a digit time slot and the presence of a digit 1 is characterized by a pulse or "message signal" in the corresponding time slot and the presence of a digit 0 is characterized by the absence of a pulse in the corresponding time slot.

It is well known that, in the transmission of message signals, the time positions of said signals are effected by certain fluctuations.

Thus, the variations of the propagation conditions in the transmission medium introduce a variation in the repetition frequency of the message signals or "slow fluctuation" the frequency of which is low and the amplitude high.

Besides, the crosstalk, the psophometric voltages and the interactions between the different signals transmitted introduce "fast fluctuations" of the time position of the message signals on either side of the average position at which they should be found if they were only affected by slow fluctuations.

In a regenerative repeater, the message signals are reshaped and then set at time positions defined by the synchronization signals. One of the systems for obtaining these synchronization signals consists in applying the regenerated signals to an oscillating circuit tuned on the repetition frequency of the pulses and which supplies, by filtering, a signal at the average working frequency of the transmission system.

It is well known that the level and the phase of this synchronization signal vary with the number and the spacing of the message signals. In the case of messages having, for example, $n=7$ digits, the transmission of the number or "code" 1111111 repeated indefinitely does not supply the same synchronization signal as the transmission of the code 1000000 repeated in the same way. It is known, in particular, that the amplitude of this signal is approximately proportional to the average number of message signals per "channel time slot," this term characterizing the time alloted to the transmission of a message.

Besides, when the transmission is made by cable, each repeater is fed by said cable so that its input and output elements are transformers making it possible to separate the supply current from the message signals. Now, it is shown that the bandwidth of these transformers, as well as that of the repeater amplifiers, must be as much wider as the average number of digits 1 is smaller.

The objective of this invention is therefore to submit numbers expressed in any binary code and, in particular, in a code without redundancy, to a transformation such that the variations of the ratio between the number of 1's contained in the different numbers of the code and the number of digits of the code, are reduced to the minimum for the whole of the code numbers.

The invention will be particularly described with reference to the accompanying drawings in which.

Figure 1:
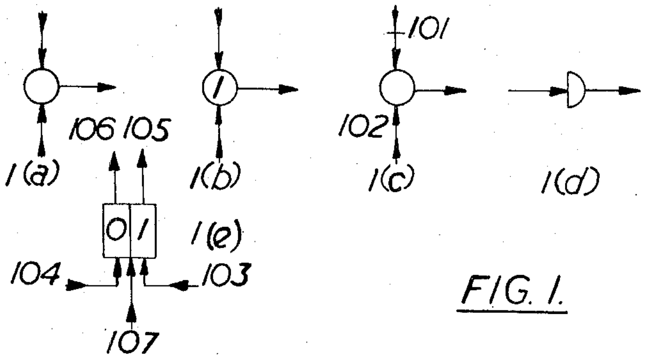
FIGURE 1 represents different symbols used in the following figures.

Before undertaking the description of the invention, the significance of the symbols used in the drawings of this invention will be specified in connection with FIGURE 1.

FIGURE 1(*a*) represents a two input AND circuit.

FIGURE 1(*b*) represents a two input OR circuit;

FIGURE 1(*c*) represents an AND circuit with two inputs 101 and 102, said circuit being blocked when a signal is applied to the input 101.

An AND circuit will be said to be "energized" when a control signal is applied to one of its inputs and to be "activated" when control signals are supplied simultaneously to all its inputs.

FIGURE 1(*d*) represents a delay circuit;

FIGURE 1(*e*) represents a bistable circuit or "flip-flop" which can be controlled, either asymmetrically or symmetrically. The asymmetrical control is symbolized by the application of a signal to one of the inputs 103 or 104. At the end of the time taken by the flip-flop to change state, this flip-flop is in the 1 state (signal on output 105) or in the 0 state (signal on output 106) whatever its initial state was; in other words, for example, the flip-flop has not changed state if it was in 1 state and it has received a signal on its output 103. The symmetrical control is symbolized by the application of a signal on the input 107. At the end of the switching time, the flip-flop is in the state opposite of its initial state, i.e. it is in the 0 state if it was in the 1 state and vice versa.

One can use as output signals, either the output voltages picked up directly on the terminals 105 and 106 which characterize the fact that the flip-flop is in the 1 or the 0 state, or the pulse appearing, for example, on output 105 during the passage of the flip-flop from the 1 state to the 0 state.

The signals and the time intervals used in such a time division multiplex transmission using pulse code modulation, will also be defined.

If the multiplexing concerns *m* messages presented in an analog form, each message is sampled once at each repetition cycle of duration R. The amplitude modulated pulses obtained by this operation are coded in any one of the known binary codes and the *m* codes are transmitted sequentially during a repetition cycle.

Each repetition cycle is, therefore, divided into *m* "channel time slots" T, T2 . . . T*m* of duration R/*m*. During a channel time slot, one transmits sequentially the *n* digits of the code to which is generally added a supplementary digit called the "guard digit." The time reserved to the transmission of a digit is therefore $$\frac{R}{m(n+1)}$$

These digit time slots will be referenced to (for the one given to the guard), *t*1, *t*2 . . . *tn*.

Further, each digit time slot is divided into four basic time slots of equal duration referenced *a*, *b*, *c*, and *d*. The basic time slot *b* of the digit time slot *t*1 will be written *t*1.*b* in the following.

Figure 2:
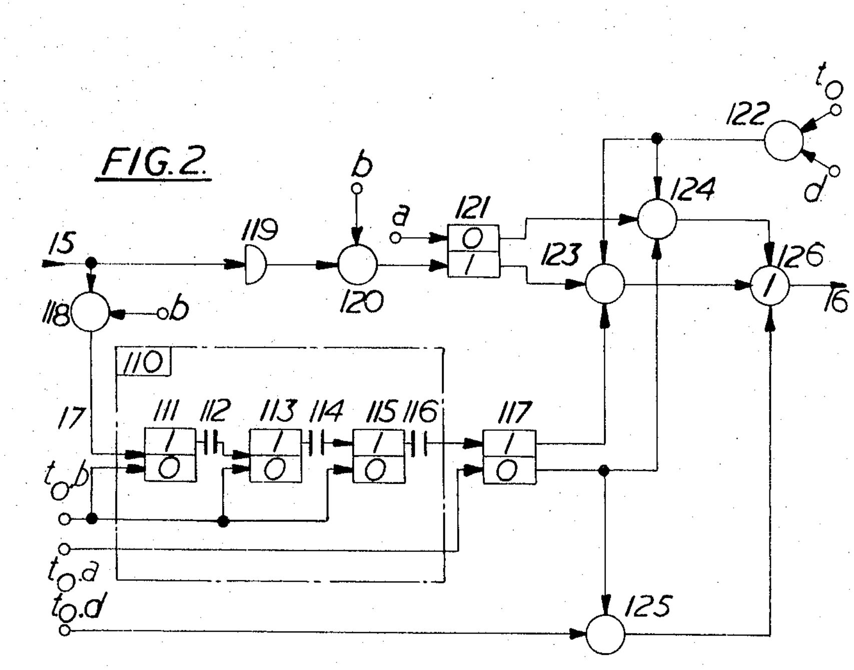
FIGURE 2 represents the equipment of the transmitting center.
Figure 3:
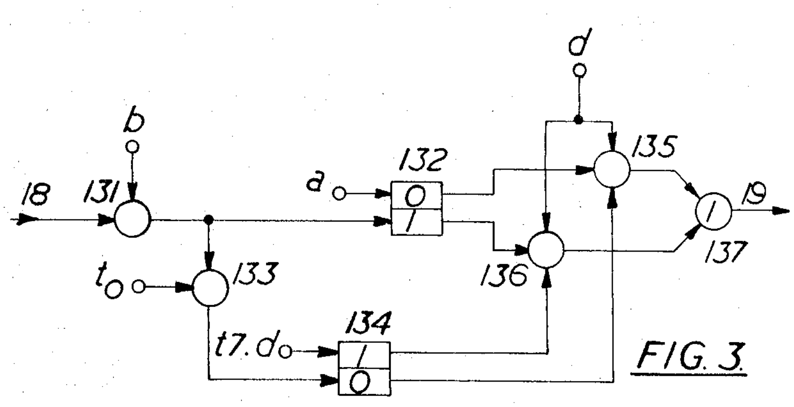
FIGURE 3 represents the equipment of the receiving center.

It will be assumed that the switching time of the bistable circuits used in the equipment described in connection with FIGURES 2 and 3, is smaller than a basic time slot.

One will now describe the principle of code transformation, according to the invention when applied to a pulse code modulation transmission system.

At is has just been seen, the messages transmitted in this system have $n$ code digits plus a guard digit which is not delivered by the coder. The value of this digit is generally chosen equal to 1 whatever be the message transmitted.

It is understood that with this system, the average number of message signals transmitted increases when the average of the variation between the number of messages signals transmitted during a channel time slot and the average number of pulses transmitted during a channel time slot decreases, which contributes towards increasing the quantity of information Q available for the elaboration of the synchronization signal.

In the system according to the invention, one chosen, as a non limitative example, to transmit as guard digit:

0 if the number is transmitted in direct form;
1 if the number is transmitted in its complemented form.

It is easily shown that Q is maximum when:

One complements for $$n1 \leq \frac{n-P}{2} \qquad (1)$$

One transmits in direct form for $$n1 > \frac{n-P}{2} \qquad (2)$$

In these inequalities, $n1$ represents the number of message signals contained in a message, and $P=0$ if $n$ is even, $P=1$ if $n$ is odd.

FIGURE 2 represents the detailed diagram of the equipment used to make the code transformation the principle of which was just described. This equipment is represented for $n=7$ so that a code is complemented if $n1 \leq 3$ and is transmitted in its direct form for $n \geq 4$. The signals delivered by the coder are received on the input 15 and it will be assumed that each message signal occupies at least the basic time slot $b$ of its digit time slot.

These signals are transmitted on one hand to the flip-flop 121 through the delay circuit 119 (bringing about a delay of one channel time slot and the AND circuit 120 (activated at time $b$), and on the other hand, to the counter 110 through the AND circuit 118 (activated at time $b$).

This counter is designed so as to control the setting of a "decision flip-flop" 117 in the 1 state when, for the message transmitted on the channel time slot $j$, one has:

$$n1 > \frac{n-P}{2}$$

This switching being effective, as will be explained later on, at time $to.c$ of the channel time slot T $(j+1)$, the AND circuit 123 is activated when the three following conditions are simultaneously present:

Flip-flop 121 in the 1 state;
Time slot signals $t1$ to $t7$ (inhibition condition in $to$ on the AND circuit 122);
Basic time slot signal $d$ (AND circuit 122).

The flip-flop 121 is reset to 0 at each basic time slot $a$.

The signals of the channel $j$ being applied to the flip-flop 121 during the time $T(j+1)$, it is seen that each message signal of the channel $j$ is transmitted directly to the output 16, at the basic time slot $d$ of the corresponding digit time slot.

If one has, in the message transmitted on the channel $j$, $$n1 \leq \frac{n-P}{2}$$

the decision flip-flop is in the 0 state at the time $to.c$ of the channel time slot $T(j+1)$. At time $to.d$, the AND circuit 125 is activated and a guard digit is transmitted on the output 16 through the OR circuit 126.

During the time slots $t1$ to $t7$ of this channel time slot, the AND circuit 124 is activated when the three following conditions are simultaneously present:

Flip-flop 121 in the 0 state;
Time slot signals $t1$ to $t7$;
Basic time slot signal $d$.

It is seen that, for each message signal of the channel $j$, the flip-flop 121 is set in the 1 state and that no signal is transmitted on the output 16. On the other hand, when there is no message signal in a time slot, the flip-flop remains in the 0 state and a signal is transmitted on the output 16 which corresponds to the complement of the code received on the input 15.

One will now briefly describe the operation of the counter 110. Each message signal appearing on the input 15 of the equipment is applied to the symmetrical input 17 of the flip-flop 111.

This flip-flop, as well as the flip-flop 113 and 115, being reset to 0 at time $to.b$ of each channel time slot, it sets from the 0 state to the 1 state for the odd message signals (1st, 3rd, 5th, 7th) received during this channel time slot and it resets from the 1 state to the 0 state for the even message signals (2nd, 4th, 6th). In the latter case, a control signal from the flip-flop 113 is transmitted through the capacitor 112 so that this flip-flop sets from the 0 state to the 1 state for the second and sixth message signals and from the 1 state to the 0 state only for the fourth message signal received during the time $T(j+1)$. In this case a control signal is transmitted to the flip-flop 115 through the capacitor 114 so that this flip-flop is only in the 1 state if four message signals have been received during the time $T(j+1)$.

As seen previously, the information written in the flip-flop 117 and which concerns the code of the channel $j$ is used for the transformation of the code at time $T(j+1)$ and it is cancelled at time $to.a$ of the channel time slot $T(j+2)$.

At $to.b$, the counter 110 is cleared and, if the flip-flop 115 was in the 1 state, a control signal from the flip-flop 117 is transmitted through the capacitor 116. This flip-flop is then definitely in the 1 state during the channel time slot $T(j+2)$ for the transmission in direct form of the code of channel $(j+1)$, if said code contains at least four message signals.

Since this counting concerns a small number, it can also be done in an analog way with an excellent accuracy by means of an adding circuit delivering a control signal from the flip-flop 117 as soon as it has received the fourth pulse.

FIGURE 3 represents the detailed diagram of the equipment used to restore the code such as it is delivered by the coder to which is associated the equipment described in connection with FIGURE 3.

The message signals coming from said equipment are received on the input 18 and it will be assumed that each one of them occupies at least the basic time slot $b$ of the digit time slot reserved to it, this time interval being delimited by the AND circuit 131. These signals are transmitted, on the one hand, to the flip-flop 132 reset to 0 at basic time slot $a$, and on the other hand, to the flip-flop 134 set in 1 state at time $t7.d$, this transmission being done only at time slot $to$ delimited by the AND circuit 133.

The outputs 0 of the two flip-flops are connected to the two inputs of the AND circuit 135 and their outputs 1 are connected to the two inputs of the AND circuit 136, these two AND circuits being activated only at basic time slot $d$. Finally the outputs of said circuits are connected to an OR circuit 137, the output 19 conductor of which constituting the output terminal of the equipment.

The latter works in the following manner:

If for example, the guard digit of a message (digit received at time slot $to$), is 1, which signifies that the message must be complemented, the flip-flop 132 sets in the 1 state at time $to.b$ and the flip-flop 134 is set in the 0 state and remains in this state up to the end of the channel time slot reserved to this message.

The AND circuit 135 is then activated at each basic time slot $d$ and, at each time slot during which no signal is received on the input 18, a signal is transmitted on the output 19. In the same way if the guard digit of a message is 0, the flip-flop 134 is set in the 1 state at time $to.b$, the AND circuit 136 is activated and the message is transmitted in its direct form between the inputs 18 and 19.

It has been seen, in relation with the inequalities (1) and (2), that the quantity of information Q available for the elaboration of the synchronization signal was maximum when all the messages in which one had $$n1 \leq \frac{n-P}{2}$$

were complemented.

In fact, it can also be shown that this quantity Q does not appreciably decrease if one takes $$n1 \leq \frac{n-P}{2} \pm k$$

($k$ being an integral) as long as the ratio $k/n$ remains low with respect to 1.

While the principles of the above invention have been described in connection with specific embodiments and particular modifications thereof it is to be clearly understood that this description is made by way of example and not as a limitation of the scope of the invention.

What we claim is:

1. In a data transmission system wherein said data is represented by binary code groups having each $n$ digits transmitted in serial form, and wherein the code signals are sent from a transmitting terminal including code transformation equipment to a receiving terminal:

clock means associated with the transmitting terminal delivering, sequentially, $n+1$ digit time slot signals of equal duration $t0$, $t1$, $t2$ . . . $tn$, each such group of signals delimiting the time interval reserved to a code group;

counting means associated with the transmitting terminal for counting the number of code signals in each code group and delivering a minority signal which is present up to the time $tn$ if said code group comprises less than $$\left(\frac{n-P}{2}+1\right)$$

code signals, P being equal to zero if $n$ is an even number, and equal 1 if $n$ is an odd number;

signal complementing means associated with the transmitting terminal and controlling, when activated by a minority signal, first the elaboration of a minority code signal transmitted at the digit time slot $to$, and second, the complementing of the $n$ digit code group so that, whatever be the number of code signals in a code group the number of transmitted code signals is higher than $$\frac{n-P}{2}$$

detection means associated with the receiving terminal for detecting the presence of a minority code signal, said means being activated at each time slot $to$ delivered by the clock means of the receiving terminal and delivering, when a code signal is received during said time slot, a complementing signal which is present up to the time $tn$; and, signal complementing means associated with the receiving terminal and controlling, when a complementing signal is present, the complementing of the digits received during the time slots $t1$ to $tn$.

2. In a data transmission system according to claim 1, and including, in the transmitting terminal, a code transformation equipment, a code restitution equipment placed in the receiving equipment and comprising:

means for applying the signals received at the digit time slot $to$, to a decision bistable circuit which sets in the 1 state if the received digit is a 0 and to the 0 state if it is a 1;

first coincidence means activated by the decision bistable when in the 1 state and transmitting directly, when activated, the code signals received during the time slots $t1$ to $tn$; and, second coincidence means activated by the decision bistable when in the 0 state and transmiting, when activated, the digits of the code group to inverter means so that said code group is complemented and that the output code is identical to the code group applied to the transformation equipment of the transmitting terminal.

No references cited.

MAYNARD R. WILBUR, *Primary Examiner.*

W. J. KOPACZ, *Assistant Examiner.*